INVENTOR
ROBERT B. SALZ

THREADED FASTENER DEVICE

Filed June 20, 1966

| A BOLT DIA. "D" | B 1-1/2 PITCH OF COARSE TH'D SERIES | C 2-1/2 PITCH OF FINE TH'D SERIES | D CONSTANT FACTOR - K - | E 1/8 BOLT DIA. | F MIN. BOLT TOOL RECESS WIDTH W(min.)= 1/8" D + K | G MAX. BOLT TOOL RECESS WIDTH W(max.)= 1.12 W(min.) | H MIN. BOLT TOOL RECESS DEPTH ACTUAL WIDTH | I MAX. BOLT TOOL RECESS DEPTH D(max.)= 1.30 W(max.) | J MAX. HOLDING TORQUE IN INCH-POUNDS |
|---|---|---|---|---|---|---|---|---|---|
| 1/4 | .075 | .085 | .020 | .031 | .051 | .057 | MINIMUM DEPTH = ACTUAL RECESS WIDTH AND ACCORDINGLY IS BETWEEN FIGURES OF COLUMNS F AND G | .066 | 15 |
| 5/16 | .084 | .104 | ↑ | .039 | .059 | .066 | | .077 | 25 |
| 3/8 | .095 | .104 | | .047 | .067 | .075 | | .087 | 35 |
| 7/16 | .107 | .125 | | .055 | .075 | .084 | | .098 | 50 |
| 1/2 | .116 | .125 | | .062 | .082 | .092 | | .107 | 70 |
| 9/16 | .125 | .140 | | .070 | .090 | .101 | | .117 | 100 |
| 5/8 | .137 | .140 | | .078 | .098 | .110 | | .125 | 130 |
| 3/4 | .150 | .156 | | .094 | .114 | .128 | | .148 | 160 |
| 7/8 | .167 | .179 | | .109 | .129 | .144 | | .168 | 180 |
| 1 | .188 | .179 | | .125 | .145 | .162 | | .189 | 200 |
| 1-1/8 | .215 | .208 | | .140 | .160 | .179 | | .208 | 230 |
| 1-1/4 | .215 | .208 | | .156 | .176 | .197 | | .229 | 260 |
| 1-3/8 | .249 | .208 | | .172 | .192 | .215 | | .250 | 280 |
| 1-1/2 | .249 | .208 | | .187 | .207 | .232 | | .269 | 300 |
| 1-3/4 | .300 | — | ↓ | .219 | .239 | .268 | | .311 | 320 |
| 2 | .333 | — | .020 | .250 | .270 | .302 | | .351 | 340 |

Fig. 6

INVENTOR
ROBERT B. SALZ

INVENTOR
ROBERT B. SALZ

THREADED FASTENER DEVICE

Filed June 20, 1966

INVENTOR
ROBERT B. SALZ 3,329,057
THREADED FASTENER DEVICE
Robert B. Salz, 1646 Stanford Ave., Menlo Park, Calif. 94025
Filed June 20, 1966, Ser. No. 558,707
13 Claims. (Cl. 85—1)

This is a continuation-in-part of application Ser. No. 426,774, filed Jan. 21, 1965, now abandoned, which was in turn a continuation-in-part of application Ser. No. 222,362, filed Sept. 10, 1962, now abandoned.

This invention relates to fastening means and, more particularly, to a threaded fastener device which may be held against rotation from its leading edge while a nut is torqued thereon.

There are numerous applications for such beneficial fasteners which require holding and tightening from the same side, i.e. where the fastener is held against rotation from the leading edge while the nut is securely torqued upon the fastener. For example, there are many requirements for "blind" bolt applications where the head of the bolt cannot be conveniently reached except by use of another man, or is perhaps altogether unreachable, requiring a fastener or bolt which could be held from the leading edge while the nut is being torqued.

There are other applications where a bolt head configuration of low profile or of special shape would be more suitable than a standard head that must be wrenched and therefore must be either of square or of hexagonal cross section to provide a wrenching surface. For example, in areas where clearance is low or where there is a requirement for a smooth surface on the bolt head, a fastener device which can be tightened from the leading edge would obviate the need for a wrenching surface on the bolt head.

By far the most important advantage for utilizing fastener devices which can be tightened from the leading edge is a substantial reduction in cost, either by reducing the bolting crew necessary for installation which decreases the installation cost, or by utilizing a fastener without a wrenching surface on the head side which is less expensive to manufacture, or both. This is particularly true in connection with high strength bolting of fabricated steel buildings, bridges, transmission towers and the like where the cost of the bolting crew and the bolts is very substantial. Utilization of a bolt which can be fastened from the leading edge would obviate the second man required to hold the head of a standard bolt while the nut is being tensioned.

In some applications, the cost of the bolt as well as its weight should be kept at a minimum without reduction of the tension that the fastening means normally and safely exerts on the structural parts. Bolts which can be tightened from the leading edge can at times be made of a smaller diameter than bolts held from the head, without reduction of its tension capacity, since they would not have to withstand the twisting or torquing motion normally associated with fastening a conventional bolt and nut assembly. A bolt which can be tightened from its leading edge need only be designed to accommodate shear and tension. Accordingly, lesser diameter bolts or a lesser number of bolts of conventional diameter may be utilized to provide the same tensioning capacity.

In most of the applications identified above, the economics of the situation require the utilization of rapid automatic fastening tools such as impact wrenches, nut runners, or any type of pneumatic or electric assembly tool. Accordingly, for a bolt which is tightened from the leading edge to be commercially feasible and acceptable, it must be adaptable for use with such automatic torquing tools. None of the "blind" bolts known heretofore have been adaptable for cooperation with automatic torquing tools.

It is also a consideration that standards set by industry and by Government agencies (building codes), in connection with the minimum amount the leading edge of a bolt must project out of the nut after the latter is tightened, must be rigidly adhered to, and that any lessening of the strength of the bolt due to the means employed to hold the bolt against rotation must be avoided. Heretofore, no "blind" bolt has been known which would meet such requirements, in fact, there are no standards for such bolts.

In connection with "blind" bolts heretofore known, it was one of its characteristics that its leading edge profile was different than that of a regular bolt and that its manufacturing cost generally greatly exceeded that of the conventional bolt.

Another important advantage in the utilization of "blind" bolts is in connection with oversized holes where lateral control during the torquing is most desired and in which holding a bolt from the leading edge insures lateral centering and axial alignment with the outer faces of the parts bolted to one another. When utilizing a standard bolt, held by its head while the nut is torqued, the application of opposite torques over the bolt length results in maximum misalignment with the result that the load is not evenly distributed over the threads. When the nut is torqued while the bolt is held from its leading edge, the bolt can properly be centered when the nut becomes snug and thereafter the tightening torque is applied about the axis which holds the bolt against rotation so that lateral as well as axial alignment is provided.

It is therefore a primary object of this invention to provide a threaded fastener device of the above-described bolt type adaptable for insertion through aligned holes in one or more assembly components and having a head configuration which provides a bearing surface transversely of the axial length and adjacent to a surface of one of the components of the assembly, said bolt being held against rotation from the leading edge while the nut is torqued thereon.

It is another object of this invention to provide a "blind" bolt for applications where the head of the bolt cannot be conveniently reached or where there is insufficient space to accommodate a bolt head with a wrenching surface.

It is a further object of this invention to provide a threaded fastener device which is more economical to manufacture and to install than conventional threaded bolts, and which is accident proof in that all fastening operations are performed from the same side by a single operator.

It is still another object of this invention to provide a threaded fastener device which can be tightened without subjecting the same to the twisting or torquing forces normally associated with the tightening of bolts from the bolt head and which therefore may have a reduced diameter without any loss of tension.

It is also an object of this invention to provide a threaded fastener device which may readily be tensioned from its leading edge with an automatic assembly tool, such as an impact wrench or a nut runner.

At least two manufacturers of both automatic and manual fastening tools of this general type have recently developed, under my direction, automatic and manual torquing devices with which the instant invention is readily compatible and which are now commercially available. These two companies are B. K. Sweeney Mfg. Co. of Denver, Colo., and Ingersoll-Rand Co. of New York, N.Y., which market the devices under my trademark "N-Driv."

It is still a further object of this invention to provide a threaded fastener device of the "blind" bolt type which has the same leading edge profile as a regular bolt and in which the tool engagement means in the end face of the leading edge can be constructed substantially without additional manufacturing costs on automatic bolt-making machines.

It is yet another object of this invention to provide a threaded fastener device of the "blind" bolt type which conforms with applicable industrial standards, building codes and other governmental regulations now applicable to standard bolts which are tightened from the head.

Another object of this invention is to provide a threaded fastener device which may be held from its leading edge against rotation while the nut is tightened thereon which neither requires engaging the leading edge portion inside the nut after the nut is tight nor the lengthening of the leading edge for holding purposes. In other words, the threaded fastener device of this invention may be dimensioned and shaped in the same manner as a conventional bolt and therefore neither loses any of its structural strength nor requires a longer leading edge.

Furthermore, it is an object of this invention to provide an improved bolt which may be held against rotation from its leading edge when a nut is tightened thereon which is economical to construct and install, capable of providing greater tension upon being torqued, and capable of being laterally aligned for oversized holes and axial aligned for improved lead distribution on all threads.

Further objects and advantages of the present invention, including the establishing of a direct correlation of the tool engagement means' critical width and depth to the holding torque requirements of a given size diameter bolt, will become apparent to those skilled in the art to which the invention pertains as the ensuing description proceeds.

The foregoing objects are generally achieved by the provision of a plurality of threaded bolt type fasteners of predetermined threaded lengths and diameters, adaptable for assembly with a nut in such a way that the nut is torqued on the bolt by mechanical means holding the leading end of the bolt and without holding the head of the bolt. Each bolt falling within a given size range is provided with a special predimensioned tool recess formed in the face of the leading end of the bolt and correlated to the particular size bolt, whereby a complementally formed tool bit of predetermined dimensions engages the bolt tool recess to preclude rotation or lateral movement thereof while the nut is torqued thereon. The said mechanical means for assembly includes power wrenching devices whereby a complementally dimensioned holding bit extends through the drive mechanism and assembled socket to properly engage the dimensioned bolt tool recess. The holding bit remains stationary, thus holding the bolt against rotation, while the socket turns to torque the nut. This mechanical means applies to special adaptors for use with standard power wrenching devices and also to standard hand wrenches and the like, modified with tool holding bits extending through the socket drive and socket to engage the bolt tool recess. Tool holding bits are spring loaded or air controlled to maintain effective engagement in the bolt tool recess during the torquing operation. These mechanical means afford the ability to control torque and tension on the bolt to a greater degree of accuracy than if the bolt were held against rotation from the head. This is explained by the fact that the holding of the bolt against rotation and simultaneous torquing of the nut are accomplished in the same confined area and the relationship can be measured and controlled with greater accuracy.

The features of novelty that are considered characteristic of this invention are set forth with particularity in the appended claims. The organization and method of operation of the invention itself will best be understood from the following description when read in connection with the accompanying drawings in which:

FIG. 6 is a chart which sets forth important critical statistics and relationships relative to the improved fastener device and its tool engaging recess;

Figure 1:
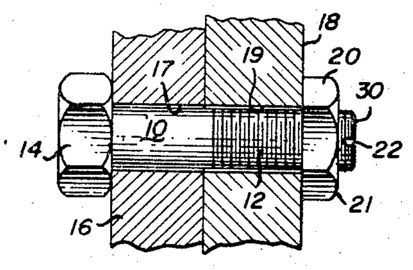
FIG. 1 is a side view of a threaded fastener device constructed in accordance with this invention with a nut for clamping a pair of elements (shown in cross section) to one another.
Figure 2:
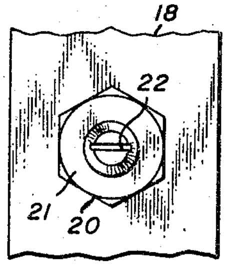
FIG. 2 is an end view of FIG. 1.

Referring now to the drawings, there is shown in FIGS. 1 and 2 a fastener device 10, constructed in accordance with this invention, including a head 14 and a threaded leading edge 12 having a tool engagement means 22 in the leading edge end face 30. While the head 14 is shown of standard hexagonal configuration, it is to be understood that said head may be of any desired shape, thickness or configuration, does not require a wrenching surface such as the hexagonal faces, but does require a head configuration which will provide a bearing surface transversely to the axis of the bolt for disposition against a surface of one of the components of the assembly with which said bolt is being used. The shank portion of the device 10 is shown as passing through an opening 17 of a first structural member 16 and an opening 19 in a second structural member 18 and having a nut 20 tightened on its leading edge 12 for securing these two structural members to one another. It is also to be noted that openings 17 and 19 may be oversized and that fastening device 10 is disposed in axial alignment with said openings.

Figure 3:
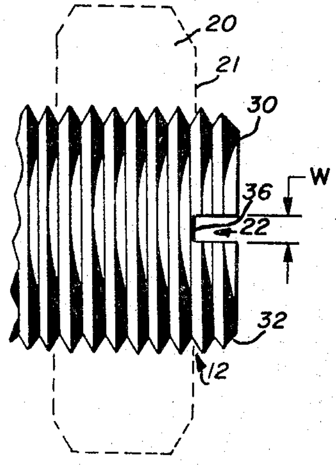
FIG. 3 is an enlarged side view of the leading edge of a threaded fastener device similar to that of FIG. 1.
Figure 4:
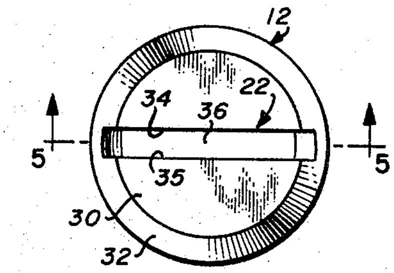
FIG. 4 is an end view of the device in FIG. 3.
Figure 5:
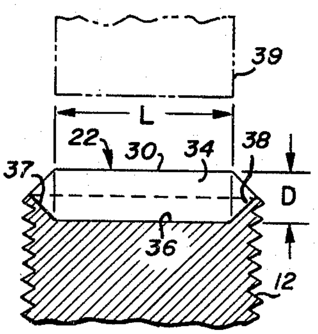
FIG. 5 is a cross-sectional view taken alone line 5—5 of FIG. 4.

Referring now to FIGS. 3, 4 and 5 showing leading edge 12 greatly enlarged, it is seen that tool engagement means 22 is in the form of a slot-like recess in end face 30. Leading edge 12 is also provided with a chamfered portion 32 which commences at the thread and terminates in end face 30. FIG. 3 also shows nut 20 in dotted outline, in its tightened position, in which the free end of the bolt projects a minimum predetermined specified distance beyond the nut in accordance with well defined limits and requirements set forth by industrial standards and government codes. For example, for high strength structural bolting, standards set by the Research Council on Riveted and Bolted Structural joints of the Engineering Foundation, as well as by The Industrial Fastener Institute, stipulate for a nut and bolt assembly, that when the nut is fully torqued on the bolt, a minimum of 1½ threads of the coarse thread series plus the end chamfer or 2½ threads of the fine thread series plus end chamfer shall extend beyond the last thread of the nut.

Tests, including free torque testing supplemented by axial loading and accelerated vibration tests during the torquing of the nut have shown conclusively the importance of limiting the tool recess depths such that the recess does not extend into the bolt below the fully torqued nut, and that if the recess goes deeper when the nut is fully torqued, the assembly is weakened and is unacceptable.

Columns B and D of the chart of FIG. 6 give, respectively, the actual axial dimensions of 1½ threads of the coarse series and of 2½ threads of the fine series for the various nominal bolt diameters of column A. Of course, the axial length of the chamfer may vary widely, and may even be and often is zero, so that the limiting total bolt tool recess depth may be larger. In fact, the limiting tool recess depth is the dimension listed in columns B or C plus the axial length of the chamfer. It should be noted at this point that this limiting tool recess depth is derived from the "standards" and the holding torque requirements have not been considered. As will become clearer hereinafter, if the "standards" were changed to, say, a minimum free end bolt projecting distances of 5 threads beyond the nut, then the depth of the recess would only be limited by the holding torque requirements as given in column I of the chart of FIG. 6. The requirement that the recess does not extend into the bolt portion below the fully torqued nut will be referred to as the "limited" recess depth to distinguish from the maximum recess depths which are based on holding torque requirements.

Figure 7:
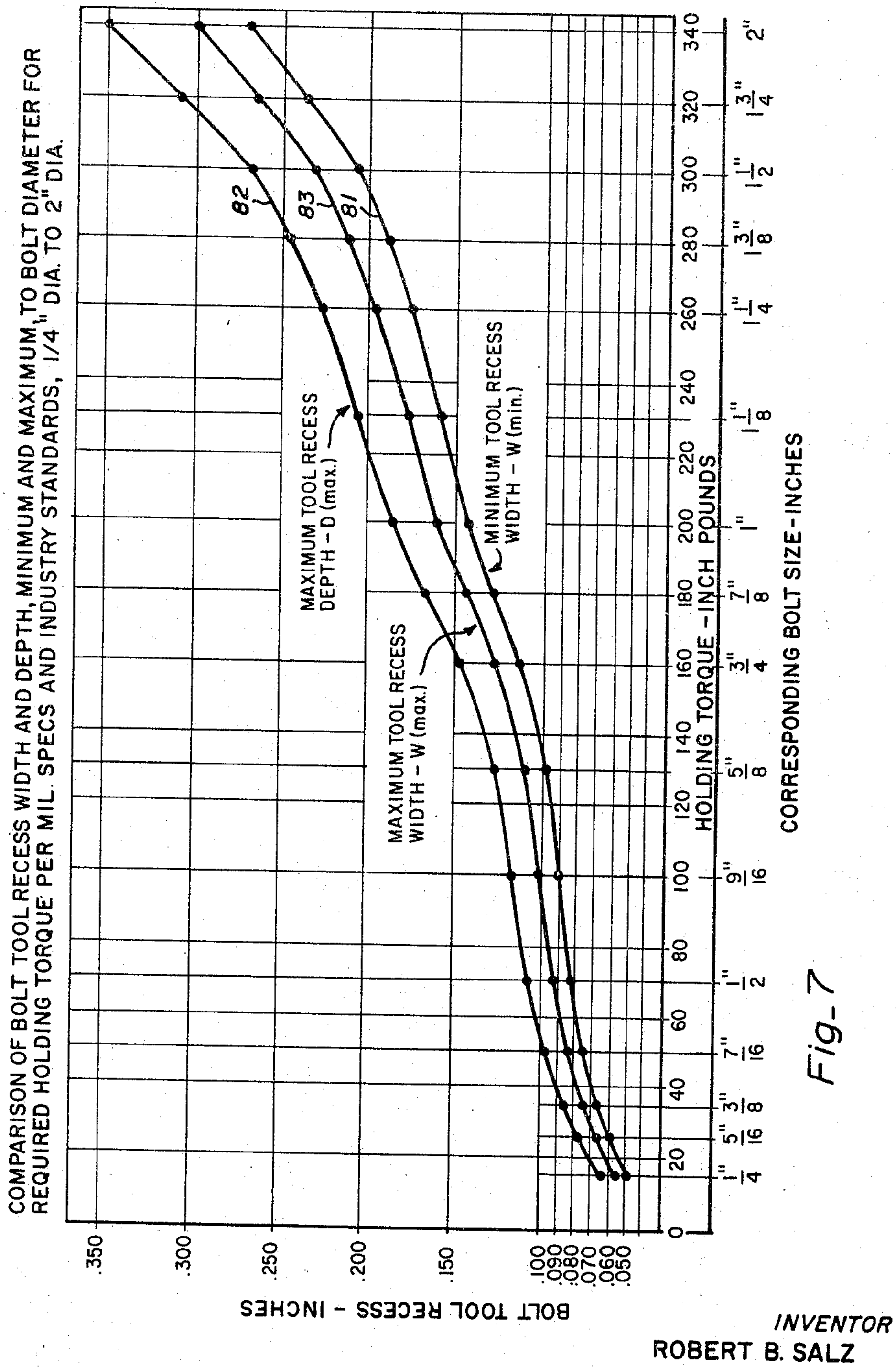
FIG. 7 is a graph showing the experimentally derived critical dimensions of the maximum and minimum tool recess widths, and the maximum tool recess depths to the various means upper holding torque required generally by Military Specifications and Industrial Standards for various bolt diameters.

Referring to the graphs shown in FIG. 7, they show graphically the experimentally determined minimum and maximum recess dimensions to attain the required and specified holding torque for the commonly used bolt sizes listed in column A of FIG. 6. Approximately 2700 bolts were used for obtaining the test results summarized in the graphs of FIG. 7, weighing some 400 lbs., and about 500 tool bits. One result of these tests was that, for all bolt sizes and their holding torque requirements, the bolt tool recess depth D must be equal to or greater than the bolt tool recess width W. Unless the requirement is satisfied, the tool holding bit will not remain properly engaged in the bolt tool recess during the full torquing cycle of the nut.

In connection with experimental determination of the minimum recess width D (min.), a tool bit having a width approximately 15% to 20% less than the recess width was utilized and the width (and, of course, the tool bit width) was progressively decreased for each bolt size until the tool bit showed a measurable distortion or deformation when holding the bolt with the specified holding torque as given in column J of the chart of FIG. 6. Any deformation or distortion was taken as an indication that the slot could not support a tool bit of sufficient width to exert the required holding torque. The recess width for each different bolt size, below which an appropriately dimensioned tool bit suffered measurable deformation, was taken as the minimum recess width and is plotted as curve 81 in FIG. 7 against the specified holding torque.

The maximum recess width D (max.) was determined in a similar manner, namely, by progressively increasing the recess width until measurable distortion or deformation of the bolt end was observed. For this test, the recess depth was kept approximately equal to the recess width. Measurable deformation of the bolt end was taken as an indication that the material remaining on either side of the recess in the leading bolt end was insufficient to oppose the specified holding torque for each particular bolt size. The recess width for each different bolt size, above which the leading edge suffered measurable deformation, was taken as the maximum recess width and is plotted as curve 82 in FIG. 7 against the specified holding torque.

The maximum recess depth D (max.) was determined again in a similar manner, namely, by increasing the recess depth until the material forming the recess walls showed measurable deformation such as spreading and thereby an indication of its inability to withstand the specified holding torque for a particular bolt size. The recess depth for each different bolt size, above which the leading edge suffered measurable spreading, was taken as the maximum recess depths and is plotted as curve 83 in FIG. 7 against the specified holding torque.

In this connection it should be understood that the nut torquing requirements specified by standards for different bolt sizes have been used as the bolt holding torque requirement, and that the holding torque requirements are not linearly related to the bolt size. In FIG. 7, the nominal bolt sizes which are required to withstand a specified holding torque have been plotted directly below the holding torque.

Figure 8:
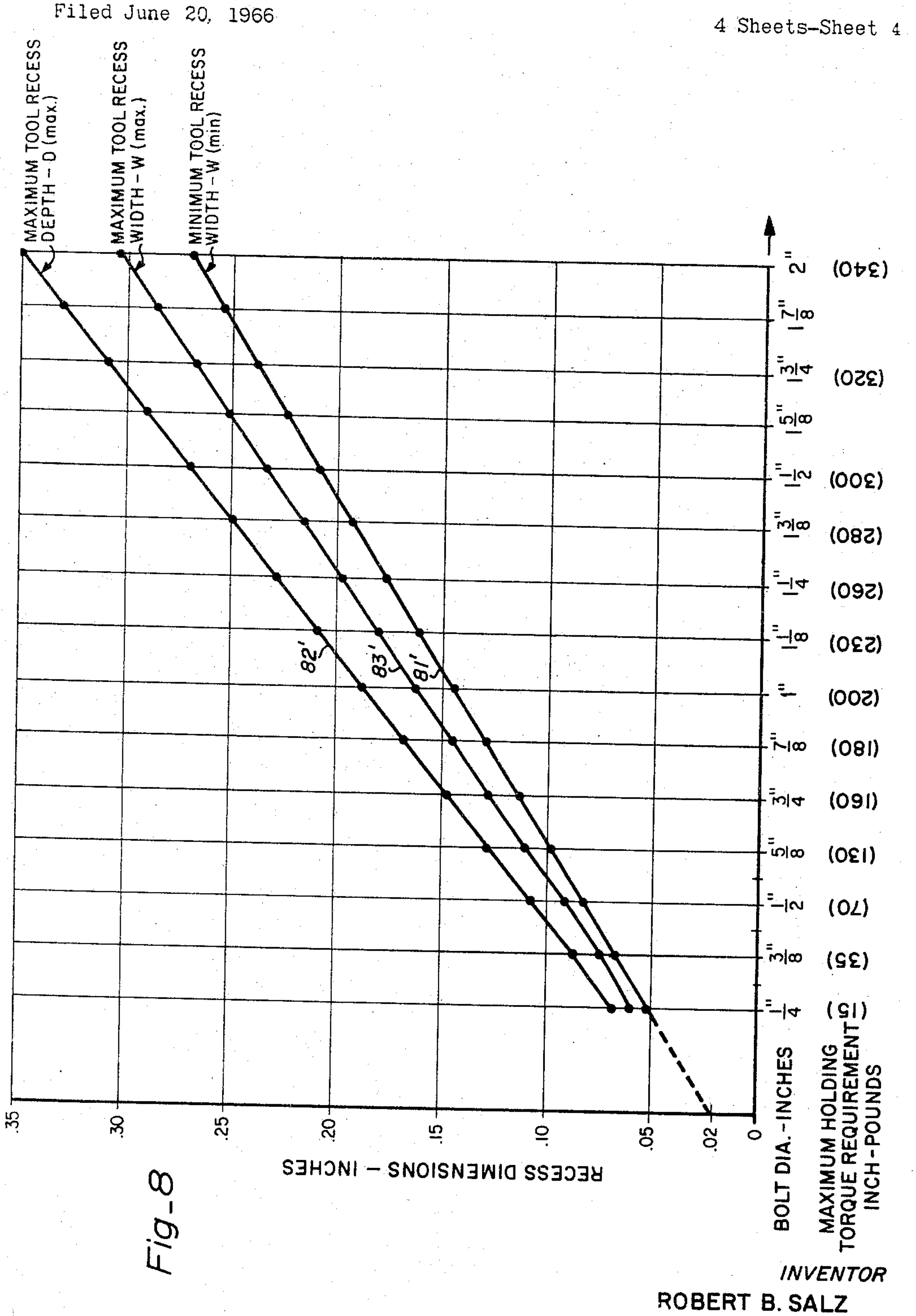
FIG. 8 is a graph, constructed from the data of FIG. 7, showing the relation of the experimentally derived maximum and minimum tool recess widths and the maximum tool recess depths to the bolt diameters.

The experimentally determined dimensions of the tool recess from FIG. 7 were then replotted in FIG. 8 against bolt diameters by using the bolt diameter as abscissa. It is significant to note that the three curves of FIG. 8, labeled respectively 81′, 82′ and 83′, and respectively referring to the maximum depths, minimum depth and maximum width of the tool recess, are substantially linear with the bolt diameter so that the critical recess dimensions can be expressed as a linear function of the bolt diameter.

In addition to the experimentally derived recess dimension, and by way of supplementation, the following is offered. The bolt tool recess is dimensioned for strength and ability to absorb impact. The torquing of a nut with an impact wrench translates the impact forces to the holding bit engaged in the bolt tool recess. The recess side walls thus become shock or stress areas and must be able to withstand the impact forces in addition to the radial forces without distortion or fractural damage to the bolt. If recesses are wider than those specified, fractural damage and bolt distortion evolve because there is less material to resist or oppose the torque. Similarly, recess depths, greater than those specified, will result in widening or angular distortion of the end of the bolt recess at maximum holding torque levels. On the other hand the narrower the recess slot, the narrower must be the tool blade to fit into the slot and therefore the weaker the tool blade.

It should be apparent to those familiar with the art, that bolt tool recesses having greater width and depth and appropriate or corresponding dimensioned tool holding bits could maintain required holding torques. However, in order to accommodate greater recess dimensions, the bolt size diameter must be greater than that which would normally be employed for a given application. A specific example would be the use of a hex or similar type holding bit and corresponding bolt tool recess. The greater depth and surface area recess requirement so weakens the normal appropriate bolt size diameter for a specific requirement, that a larger size diameter bolt must be used. Therefore, to provide for a recess depth beyond those specified in the chart of FIG. 6 would generally prove the completed nut and bolt assembly not acceptable to the prescribed Industrial Fastener Institute and other agency standards.

The United States Department of Defense agencies will accept bolts with bolt tool recesses not exceeding the "limited" recess depths as specified herein, as standard bolts for approved assembly and as conforming to basic specifications and standards of assembly. From columns I, F and G it is readily seen that the "limited" depths fall within the maximum and minimum recess depth. It has been emphasized by the U.S. Navy, Bureau of Ships, Code 634, that the depth of the bolt tool recess is a critical factor for use and approval. Present and future requirements of bolt and nut assemblies are becoming increasingly important as to dimensional specifications.

When the nut is torqued on the bolt it must overcome one or more of the following frictional variants: normal surface friction, plating and coatings, surface roughness, joint material hardness, variances in materials and material grades, nut and bolt types and styles, and combinations of finishes and coatings. All standard locknuts have published prevailing torque or frictional characteristics. It is also established that the "natural torque coefficients" are higher for small diameter bolts than for the larger sizes. Nonetheless these "natural torque coefficients" changes are not uniform due to the various frictional variants which may be present.

Column J of the chart of FIG. 6 describes the maximum holding torque requirements for each diameter size bolt. The holding torque is defined as the amount of holding force required to hold the bolt against rotation while torquing the nut, and to that point where the frictional forces between the head of the bolt and the assembled part tension the bolt. The holding torques shown in the FIG. 6 chart are based on available published data on standard locknuts conforming to Federal, Military, ASA and British standards as applicable. An additional 10% allowance is added for all other frictional variants.

It has been shown that the bolt tool recess width and depth dimensions and relationships for a single straight recess are critical and are directly related to the holding torque requirements of each size diameter bolt. The holding torque requirement, more specifically, is the unit torque caused by friction on the contact threads. The holding torque requirement varies with the coefficient of thread friction and also with the radius of action of friction on the thread surfaces. This radius may vary from the inner to the outer radius of contact of threads, and is specifically related to the bolt diameter. It has been determined by repeated tests that the tool recess dimensions for specific bolt sizes are directly related to the bolt diameter in order to receive a dimensioned tool holding bit which will attain the prescribed holding torque on the bolt. This relationship has been determined from the graphs of FIG. 8 and is specifically expressed as ⅛ of the bolt diameter, plus a constant factor equal to .020" (see column F of the chart of FIG. 6).

The constant .020" factor K is believed to be explainable upon a consideration of the friction and holding torque requirements and represents the minimum width (thickness) tool bit which will maintain a measurable 1 inch-pound, or more, holding torque and is thus used as the initial plus factor in all calculations. Bolts used in these tests were produced from various materials including low carbon and high carbon heat treated steel, alloy steel heat treated, and aluminum. All nuts used with steel bolts were approximately 75% hardness of the bolt. Aluminum nuts were from 75% hardness of the bolts to equal hardness. Test results with all materials used proved out a 10% allowance for "all other frictional variants."

The accompanying chart in FIG. 6 sets forth all recess dimensions which are also graphically illustrated in FIG. 8. Column A is the bolt diameter size; column B is 1½ the pitch of a coarse thread bolt and column C is 2½ the pitch of a fine thread bolt; column D is the constant factor; column E is indicative of the computed ⅛ bolt diameter; columns F and G set forth respectively the minimum and maximum recess widths; column H indicates range of minimum recess depths; column I is the computed maximum recess depths which are further subject to the limited recess depths of columns B and C plus chamfer; and column J is the maximum holding torque requirements in inch-pounds. Recess dimensions may be taken from the graph of FIG. 8 or may be calculated by the following formulae. The chart of FIG. 6 also embodies summaries of the following formulae defining the procedures to calculate basic straight bolt tool recess dimensions for all diameter size bolts and for bolts produced from all materials or combinations thereof tested.

The minimum width bolt tool recess is ⅛ of the bolt diameter plus said .020" factor as determined by curve

81'. The maximum width is the minimum plus 12% thereof as determined from curve 83'.

The maximum depth of the bolt tool recess is equal to the minimum depth of the recess plus 30% as determined from curve 82', but is not to exceed the depth of 2½ times the pitch for fine threads or 1½ times the pitch for coarse threads plus the chamfer (the limiting recess depths). The minimum depth is equal to the actual recess width.

The graph of FIG. 8 sets forth the comparison of bolt tool recess depth (minimum and maximum) to bolt diameter for required holding torque. It will be noted that the maximum recess depths approximate the maximum allowable depth computed by using thread pitch, but that for larger bolts the allowable depth is somewhat less. The minimum recess width is specified as to allow a tool bit of sufficient width, length, and strength to maintain required holding torque. The limitation of maximum width was determined at that point where measurable distortion or damage occurred to the end of the bolt, or recesses so indicated, so as to cause the rejection of the assembly. It should be noted that the width and thus the strength of the tool bit must be such as to maintain effectiveness for many hundreds or even thousands of assemblies.

Proceeding more specifically with the specific description of the tool recess as illustrated in the accompanying FIG. 3, there is shown the slot 22 provided in the leading end face 30 having a pair of substantially parallel side walls 34 and 35, a bottom surface 36 substantially square with the side walls, and a pair of upwardly sloping opposed end walls 37 and 38. The dimensions of slot 22, and particularly its depth D and its width W have been shown to be most important in connection with the construction and operation of the fastening device of this invention in order to accomplish the stated objects.

The depth D of the slot 22 may vary between certain limits but must not be less than that necessary to provide the side walls, which afford a flat blade-like holding tool such as indicated in dotted outline 39 a secure grip, to hold the leading edge against rotation.

The bottom face 36 of slot 22 may be conveniently planar to conform to the straight edge end face of the engaging tool bit as 39. The corner between side walls 34 and 35 and bottom face 36 need not be sharp, but may be slightly rounded with an internal radius to facilitate the coining of recess 22 with an impact male die during manufacture. It is to be understood that face 36 need not be planar, but may be arcuate or curved throughout its length and along its width to generally conform to the end face of the engaging tool bit. It may also be U or V-shaped widthwise with the greatest depth not exceeding the "limited" recess depth. It may also be V-shaped lengthwise but the average depth must be within the minimum and maximum recess depth as given in the chart of FIG. 6.

End walls 37 and 38 of slot 22 are formed by upwardly and outwardly sloping extensions of bottom face 36. Those ends walls provide a centering means in recess 22 for centering tool bit 39 therein. While end walls 37 and 38 are not essential for practicing the instant invention, such centering means provides a useful guide for the engaging of the holding tool bit, particularly in connection with the utilization of impact tools.

Figure 9:
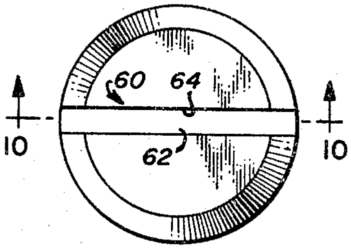
FIG. 9 is an end view, like that of FIG. 4, of a further embodiment of this invention.

The outwardly and upwardly sloping extensions of bottom face 36, in addition to providing a centering means, also aid in the impact coining of recess 22. Since the economics of bolts requires utilization of mass production techniques, such as automatic bolt makers, recess 22 is coined at the same time the flat end face 36 is formed by impact with a suitable die. If the impact die is formed to produce a straight-through recess 60 having a pair of side walls 64 and a bottom face 62 such as shown in FIGS. 8 and 9, there may be a certain amount of spreading. By forming recess 22 with some sort of end faces, whether they be tapered or otherwise configured, spreading during slot coining operation is minimized and tapered end portion 32 remains true round.

A slot length L is defined by the length of recess 22 which can be engaged by tool bit 39. When centering means are provided at both ends of slot 22, the useful length L is decreased. In FIG. 5 the length L is defined as the planar bottom of face 36. Length L should be sufficiently long so that the distance through which the force is applied to hold the bolt against rotation does not become excessive. Since the holding torque is directly proportional to the distance of application of the force from the axis of device 10, the greater L, the smaller the force per unit length. Accordingly, maximum possible length of the slot is desired. It is apparent that the location of the bolt tool recess is important and requires the length of recess to be centered at the bolt axis such that the extension in either direction from the center equals or exceeds ⅜ the bolt diameter. The minimum total length is ¾ the bolt diameter. The minimum length and location is critical as full engagement of the tool holding bit in the bolt tool recess is mandatory. The diagonally opposite side edges of the bit must engage the adjacent flat walled sides of the recess such that the radius inscribed is equal to or greater than 37½% of the bolt diameter. This relates directly to the radius of action of friction on the thread surfaces and the bolt diameter.

The width of the recess is centered at the bolt center axis such that the longitudinal center line of the recess does not deviate from the bolt center axis by more than 12% of the recess width. The tool holding bit maximum deflection of shaft and width tolerance (thickness) requires proper centering of the recess for effective engagement.

The side walls of bolt tool recess should be parallel to the bolt axis. A maximum tolerance of 4 degrees in an outward direction is allowable for each side wall. Thus there may be a total of 8 degrees outward deflection at the top of the recess. If this tolerance and the foregoing ratios of width to depth are not maintained, the tool holding bit will not maintain proper engagement in the bolt tool recess during the full torquing cycle.

In case of outwardly sloping side walls, the minimum and maximum width of the recess refers to the side wall separation at the bottom of the recess. Accordingly, for sloping side walls the recess width at the top of the recess is equal to the width of the recess at the bottom of the recess plus twice the product of the depth of the recess times the tangent of the angle of the side wall slope. For a 4-degree slope of each side wall, the maximum allowable slope, the recess width of the top wall be approximately equal to 1.14 times the recess width of the bottom, assuming a recess depth approximately equal to the recess width.

Although the side walls should ideally be parallel, the recess width may vary from one end to the other within the minimum and maximum width specifications shown in the chart of FIG. 6; and the straight depth of the recess side walls must equal or exceed the minimum recess width.

Figure 11:
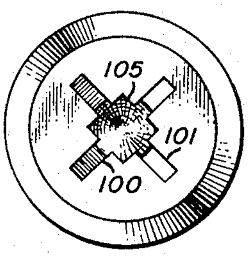
FIGS. 11 and 12 are end views showing different numbers of tool recesses which may be provided in the leading end of the fastener device of this invention.

Instead of utilizing a single slot in the leading edge, a plurality of them may be provided. As indicated in FIG. 11, a pair of slots 100 and 101 may be arranged in cruciform relation, either with or without a center configuration 105, or as indicated in FIG. 12, three slots 102, 103 and 104 may be arranged in a star pattern, with or without center configuration 106.

A cross or cruciform bolt tool recess (FIG. 11) is constructed by forming two single straight bolt tool recesses, such that the center lines of each are perpendicular and intersect at the bolt center axis. Recess depth must conform to specifications per the chart of FIG. 6. Recess width must also conform to the specification set forth in the chart of FIG. 6 except that all values are reduced by 25%. This is readily explainable since the tool, being double fluted, requires a lesser minimum blade thickness for each cruciform blade, and the material remaining in the bolt end is less and therefore requires a lesser recess width or more material. Further, the total (combined) recess lengths of the crossed recesses should be equal to and preferably greater than the bolt diameter. Finally, each recess must be centered at the bolt center axis, both lengthwise and widthwise, within tolerances previously indicated.

An interrupted straight tool recess is constructed by forming a round circular, fluted, conical or some other center configuration, such as 105 or 106, at the axis of the bolt. Such a center configuration may be used either with a single or multiple tool recess as shown in FIGS. 11 and 12, in connection with multiple recesses. Such center configuration will assist in the centering of the tool bit which has usually the same central configuration as the center configuration. The center configuration of the interrupted recess is subject to the same depth limitation as specified in FIG. 6 chart. The center configuration of the recess, for either a single or a cross recess, is limited in outside dimensions such that it would be within an inscribed circle, centered at the bolt axis, with radius not exceeding ¼ the nominal outside bolt diameter and all other recess dimensions must conform to those specified in the chart of FIG. 6.

Figure 12:
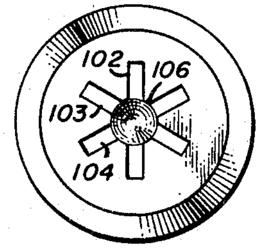
Figure 10:
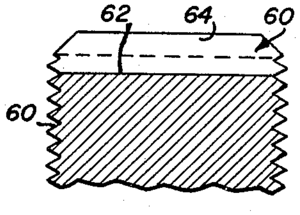
FIG. 10 is a detailed cross section view. taken along line 10—10 of FIG. 9.

In case of a cross recess with a center configuration, such as shown in FIG. 12, the center configuration should be approximately ¼ of the nominal outside bolt diameter as with a single interrupted recess. Further, the minimum recess length for each recess is approximately ½ of the nominal outside bolt diameter in order to satisfy the requirement that the combined length is at least equal to the bolt diameter. The minimum recess width has been found to be ½ of that specified for a single straight recess and the maximum recess width has been found to be ¾ of that specified for a single straight recess.

In operation, the threaded fastener is tightened in much the same manner as a "blind" bolt, that is, from its leading edge. More particularly, the bolt is held against rotation with a tool bit which engages the recess at the leading edge, and the nut is tightened upon the bolt in the usual manner as if the bolt were held against rotation from its head.

This invention also relates to loosening a nut or disassembly. This procedure is accomplished by the same means as for tightening, except that the nut is turned in an opposite or reverse direction while the bolt is held against rotation with the tool holding bit engaged in the bolt tool recess. All of the mechanical means heretofore described are equally adaptable to disassembly.

There has been described a fastening device which is held against rotation from the leading edge while the nut is torqued. The leading edge has a tool engagement means in its end face which can be formed in the same operation with coining its end face. The end face of the leading edge has the same profile as a conventional threaded bolt. Accordingly, an improved fastener has been evolved which achieves all of the objects and advantages as set forth in the preamble of this specification.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following appended claims.

What is claimed is:

1. An improved fastener means of predetermined length and circumferential area for cooperation with mechanical tool holding bit means comprising in combination:

a bolt body providing with a spirally-threaded portion terminating in a free, substantially planar end wall;

an enlarged means at the other end of said bolt body having a bearing surface disposed substantially at right angles to the axis of said bolt body;

at least one transversely extending recess provided in said free end wall to receive the tool bit means;

said recess including substantially parallel side walls spaced apart to define a width dimension and terminating in a bottom wall defining a depth dimension, the maximum and minimum width and depth of said recess being selected in accordance with a holding torque requirement provided by said tool bit means and computed in accordance with the following formulae:

$$W(\text{min.})=\tfrac{1}{8}D+K$$

wherein W(min.) is the minimum width of the recess, D is the diameter of a given bolt body, and K is a function of the required holding torque whose value is substantially equal to 0.020 to thereby allow the recess to accommodate a tool bit means capable of at least applying the required holding torque;

$$W(\text{max.})=AW(\text{min.})$$

wherein W(max.) is the maximum width of the recess at the bottom of said recess and A is a function of the shear strength of the material of which the bolt is constructed whose value is substantially equal to 1.12 for a standard high strength structural bolt material; and the minimum depth is equal to the actual width of the recess.

2. An improved fastener means as defined in claim 1 where said recess has a maximum depth $$D\ (\text{max.})=1.30W\ (\text{min.})$$

wherein D (max.) is the maximum depth of the recess at said bottom wall.

3. An improved fastener means of predetermined length and circumferential area for cooperation with mechanical tool holding bit means comprising in combination:

a bolt body provided with a spirally-threaded portion terminating in a free, substantially planar, end wall;

an enlarged means at the other end of said bolt body having a bearing surface disposed substantially at right angles to the axis of said bolt body;

a transversely extending recess provided in said free end wall to receive the tool bit means;

said recess including a pair of substantially parallel side walls and terminating in a bottom wall, said side walls being spaced apart to define a maximum width dimension at the point of intersection with said bottom wall in accordance with the formula:

$$W\ (\text{max.})=1.12W\ (\text{min.})$$

further expressed $$W\ (\text{max.})=1.12(\tfrac{1}{8}D+K)$$

wherein $W$ (max.)=maximum width of the recess at said bottom wall;

$D$ (min.)=minimum width of the recess;

$D$=diameter of the bolt body; and $K$=0.20, a constant factor;

and said bottom wall being spaced from said end face to define a minimum recess depth equal to the actual width of said recess.

4. An improved fastener means as defined in claim 3 in which the outward slope tolerance of each of said substantially parallel side walls does not exceed 4 degrees so that the recess width in the plane of said end wall does not exceed 1.14W (max.).

5. An improved fastener means as defined in claim 3 wherein the depth of said recess does not exceed two and one-half times the fine thread pitch plus the axial length of any tapered portion between the last thread and said end face.

6. An improved fastener means as defined in claim 3 wherein the depth of said recess does not exceed one and one-half times the coarse thread pitch plus the axial length of any tapered portion between the last thread and said end face.

7. An improved fastener means of predetermined length and circumferential area for cooperation with mechanical tool holding bit means comprising in combination:

a bolt body provided with a spirally-threaded portion terminating in a free, substantially planar, end wall;

an enlarged means at the other end of said bolt body having a bearing surface disposed substantially at right angles to the axis of said bolt body;

at least one transversely extending recess provided in said free end wall to receive the tool bit means;

said recess including substantially parallel side walls spaced apart to define a predetermined width dimension and terminating in a bottom wall which is spaced from said end face a maximum depth dimension in accordance with the formula:

$$D\ (\text{max.})=1.30W\ (\text{min.})$$

further expressed $$D\ (\text{max.})=1.30(\tfrac{1}{8}D+K)$$

wherein $D$ (max.)=maximum depth of the recess;

$W$ (min.)=minimum width of the recess;

$D$=diameter of a given bolt body; and $K$=.020, a constant factor;

said recess having a minimum depth dimension equal to the actual width of said recess.

8. An improved fastener means of predetermined length and circumferential area for cooperation with mechanical tool holding bit means comprising in combination:

a bolt body provided with a spirally-threaded portion terminating in a free, substantially planar, end wall;

an enlarged means at the other end of said bolt body having a bearing surface disposed substantially at right angles to the axis of said bolt body;

at least one transversely extending recess provided in said free end wall to receive the tool bit means;

said recess including substantially parallel side walls spaced apart to define a width dimension and terminating in a bottom wall defining a depth dimension, the maximum and minimum width and the minimum depth of said recesses being computed in accordance with the following formulae:

$$W\ (\text{min.})=\tfrac{1}{8}D+K$$

wherein W (min.) is the minimum width of the recess, D is the diameter of a given bolt body, and K is a constant factor of .020;

$$W\ (\text{max.})=1.12W\ (\text{min.})$$

wherein W (max.) is the maximum width of the recess at the bottom of said recess; and the minimum depth always being equal to the actual with of the recess.

9. An improved fastener means of predetermined length and circumferential area for cooperation with mechanical tool holding bit means comprising in combination:

a bolt body provided with a spirally-threaded portion terminating in a free, substantially planar, end wall;

an enlarged means at the other end of said bolt body having a bearing surface disposed substantially at right angles to the axis of said bolt body;

at least one transversely extending recess provided in said free end wall to receive the tool bit means;

said recess including substantially parallel side walls spaced apart to define a width dimension and terminating in a bottom wall defining a depth dimension, the maximum and minimum width and depth of said recess being computed in accordance with the following formulae:

$$W\ (\text{min.})=\tfrac{1}{8}D+K$$

wherein W (min.) is the minimum width of the recess, D is the diameter of a given bolt body, and K is a constant factor of .020;

$$W\ (\text{max.})=1.12W\ (\text{min.})$$

wherein W (max.) is the maximum width of the recess at the bottom of said recess;
the minimum depth is equal to the actual width of the recess; and
the maximum depth $D$ (max.)$=1.30W$ (min.), wherein D (max.) is the maximum depth of the recess.

10. An improved fastener means of predetermined length and circumferential area for cooperation with mechanical tool holding bit means comprising in combination:
a bolt body provided with a spirally-threaded portion terminating in a free, substantially planar, end wall;
an enlarged means at the other end of said bolt body having a bearing surface disposed substantially at right angles to the axis of said bolt body;
a pair of interrupted transversely extending recesses at right angles to one another provided in said free end wall to receive the tool bit means, said recesses intersecting at their mid-points at the axis of said bolt body;
a center configuration, axial with the axis of said bolt body, interrupting said pair of recesses;
the minimum length of each of said recesses being equal to one-half of the diameter of said bolt body;
the maiximum length of each of said recesses being equal to three-quarters of the diameter of said bolt body;
the minimum and maximum width dimensions of the recesses being defined by the formulae:

$$W\ (\text{min.})=\tfrac{1}{2}(\tfrac{1}{8}D+K)$$

$$W\ (\text{max.})=\tfrac{3}{4}(\tfrac{1}{8}D+K)$$

where
$W$ (min.)=minimum width of the recesses;
$W$ (max.)=maximum width of the recesses at the bottom of the recesses;
$D$=diameter of the bolt body;
$K$=.020, a constant factor; and
the minimum depth of said recesses being equal to the actual width of said recesses.

11. An improved fastener means of predetermined length and circumferential area for cooperation with mechanical tool holding bit means comprising in combination:
a bolt body provided with a spirally-threaded portion terminating in a free, substantially planar, end wall;

an enlarged means at the other end of said bolt body having a bearing surface disposed substantially at right angles to the axis of said bolt body;
a pair of uninterrupted transversely extending recesses at right angles to one another provided in said free end wall to receive the tool bit means, said recesses intersecting at their mid-points at the axis of said bolt body;
the minimum and maximum width dimensions of each recess being defined by the formulae:

$$W\ (\text{min.})=\tfrac{3}{4}(\tfrac{1}{8}D+K)$$

$$W\ (\text{max.})=1.12W\ (\text{min.})$$

where
$W$ (min.)=minimum width of the recess at the bottom of said recess;
$W$ (max.)=maximum width of the recess;
$D$=diameter of the bolt body;
$K$=.020, a constant factor; and
the minimum depth of each recess being equal to the actual width of the recess.

12. An improved fastener means in accordance with claim 11 in which the minimum combined length of said recesses is equal to the diameter of said bolt body.

13. An improved fastening means in accordance with claim 12 in which the minimum length of each recess is equal to one-half of the diameter of said bolt body.

References Cited

UNITED STATES PATENTS

| | | | |
|---|---|---|---|
| 967,436 | 8/1910 | Ramsey | 85—1 |
| 2,388,658 | 11/1945 | Pumphrey | 85—1 |
| 2,408,366 | 10/1946 | Boyer | 85—45 |
| 2,727,256 | 12/1955 | Moore | 85—1 |
| 2,877,680 | 3/1959 | Brown | 85—1 |
| 2,940,495 | 6/1960 | Wing | 85—45 |

FOREIGN PATENTS

| | | |
|---|---|---|
| 576,676 | 5/1958 | Italy. |

OTHER REFERENCES

Bolts, Nuts and Screws, published by the Lamson and Sessions Company, Cleveland, Ohio, 1944 (p. 77 relied on) (copy in Group 352).

Bolts, Nut and Rivet Standards, compiled by Industrial Fasteners Institute, Cleveland, Ohio, 1952, (p. 117 relied on) (copy in Group 352).

CARL W. TOMLIN, *Primary Examiner.*

M. PARSON, Jr., *Assistant Examiner.*